Aug. 14, 1945.  A. S. HOWELL  2,382,228
CENTRIFUGALLY CONTROLLED GOVERNOR DEVICE
Filed May 8, 1943

INVENTOR
ALBERT S. HOWELL
BY Robert H. Miehle
ATTY.

Patented Aug. 14, 1945

2,382,228

UNITED STATES PATENT OFFICE 2,382,228

CENTRIFUGALLY CONTROLLED GOVERNOR DEVICE

Albert S. Howell, Culver, Ind., assignor to The Bell & Howell Company, Chicago, Ill., a corporation of Illinois Application May 8, 1943, Serial No. 486,183

6 Claims. (Cl. 188—185)

My invention relates particularly to centrifugal speed governors such as are used in maintaining a constant operating speed of spring driven mechanisms.

The general object of the invention resides in the provision of a novel, effective and accurate centrifugally controlled friction device which is particularly adapted for maintaining uniform operating speeds of spring driven motion picture cameras, having in view compactness and desirable adjustment for different controlled speeds.

The invention will be better understood by reference to the accompanying drawing in which—

Figure 1:
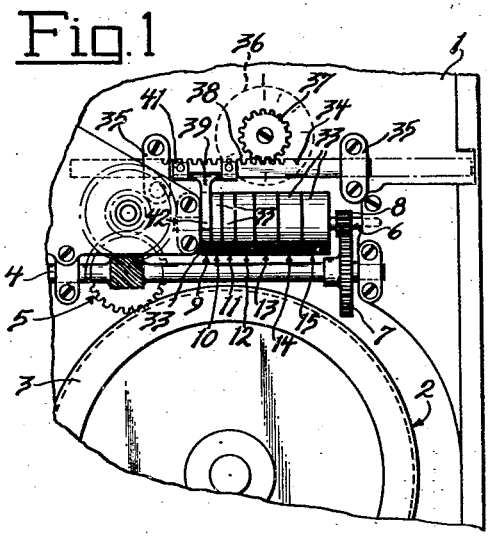
Figure 1 is a partial side elevation of a motion picture camera embodying a centrifugal governor of my invention with parts omitted and parts broken away.
Figure 2:
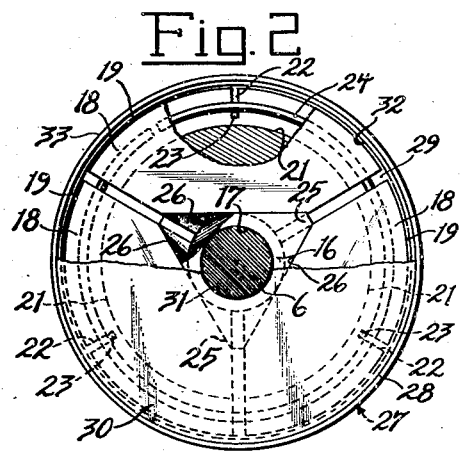
Figure 2 is an end elevational view of the rotor assembly of the governor partially broken away and partially in section.

Referring to the drawing, a motion picture camera casing is designated at 1, and mounted within the casing is a spring motor, generally designated at 2, which includes a spring driven rotatably mounted casing 3. See Figure 1. Power is transmitted from the motor casing 3 to a rotatably mounted transmission shaft 4, connected with the camera mechanism, not shown, to drive the same, by means of a multiplying gear train generally designated at 5.

A rotatably mounted governor shaft 6 is driven from the transmission shaft 4 by means of a spur gear 7 secured on the shaft 4 and meshing with a spur gear pinion 8 secured to the shaft 6. A plurality of coaxial centrifugal governors 9, 10, 11, 12, 13, 14 and 15 are mounted on and carried by the governor shaft 6 and are arranged in progression therealong and each of these governors comprises as follows:

Referring to Figures 2 to 6, an axially bored driving hub 16 has the governor shaft 6 engaged with a press fit through the axial bore 17 of the hub so that the hub is carried by and secured with the shaft for rotation thereby. Three segmental weighted friction members 18 are arranged angularly about the hub and terminate outwardly from the axis of the hub with convex arcuate friction surfaces 19 facing radially outward from and conformable with an external surface of revolution of said axis.

The friction members 18 are provided with grooves 21 at the friction surfaces 19 extending and alining angularly of the axis of the hub 16 and are provided with axially extending additional grooves 22 at the intermediate portions of the friction surfaces 19 and joining the grooves 21. Spacing wires 23 are engaged in the grooves 22 and traverse the grooves 21, and a radially expansible split spring ring 24 is positioned in the grooves 21 and engages about the spacing wires to yieldably urge the friction members 18 radially inward with respect to the axis of the hub 16 against the influence of centrifugal force when the friction members are rotated, the spacing wires 23 effecting friction reducing point engagement with the spring 24 intermediate the angular extent of the friction surfaces 19 of the friction members 18 and permitting adjusting oscillation of the friction members with respect thereto.

The ends of the hub 16 are each provided with three cam portions 25 spaced angularly about and projecting outwardly from the axis of the hub, and the friction members 18 are provided at their inner portions with cooperating surfaces 26 facing inwardly toward the axis of the hub and engaged by the cam portions 25 to provide driving connections between the hub and the friction members operative to simultaneously rotate the friction members with the hub and to urge the friction members radially outward from the axis of the hub.

A friction member 27 cooperating with the centrifugally controlled friction members 18 is in the form of a drum comprising a peripheral wall 28 and axially spaced radial walls 29 and 30, the radial wall 29 being integral with the peripheral wall, and the radial wall 30 being a separate piece suitably secured to the lip of the peripheral wall.

The assembly of the friction members 18 and the hub 16 are enclosed within the drum 27, thus forming a desirable assembly unit, and the radial walls 29 and 30 are provided with bearing bores 31 coaxial with the peripheral wall 28, and the governor shaft 6, extending through the axial bore 17 of the hub 16 in angularly fixed relation therewith for driving the same, also extends through the bores 31 with a bearing fit so that the drum is rotatably mounted thereon for rotation relative to the friction members 18 and the hub 16 in coaxial relation therewith.

The inner surface 32 of the peripheral wall 28 of the drum provides a radially facing internal surface of revolution of the axis of the drum and of the hub 16 encompassing the friction members 18 for frictional engagement by the friction surfaces 19 as the friction members are moved radially outward under the influence of centrifugal force, and the outer surface 33 of the peripheral wall 28 of the drum provides a radially facing external surface of revolution of said axis.

As the governor shaft 6 is rotated, the weighted friction members 18 are urged outwardly under the influence of centrifugal force in opposition to the spring 24 to frictionally engage the surface 32 of the drum 27 with a pressure varying with the speed of the shaft which results in corresponding driving torque on the drum. Assuming the drum to be held stationary or its rotation opposed, the friction members 18 are further urged outwardly into engagement with the surface 32 of the drum 27 with a pressure varying with the torque between the hub 16 and the friction members 18 by reason of the cam portions 25 engaging the surfaces 26 of these friction members, thus augmenting the centrifugal control of the pressure between the friction members and the drum.

Figure 4:
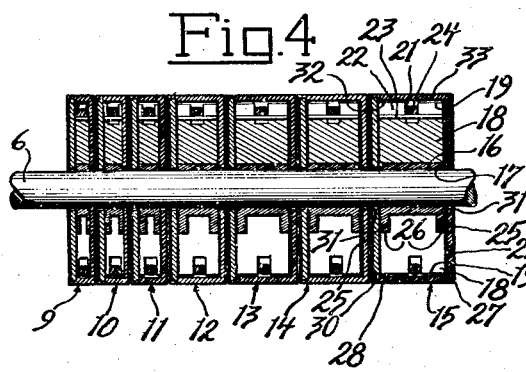
Figure 4 is an axial sectional view of the rotor assembly of the governor.

The plurality of governors 9 to 15 inclusive are identically related in coaxial relation with the governor shaft 6 and the hubs 16 are each driven by this shaft, and the governors are of different control characteristics in that the axial dimensions thereof are different, as best shown in Figure 4, so that each is capable of maintaining a predetermined speed of the governor shaft 6 and of the camera mechanism different from the speeds which the others are capable of maintaining, the governors being caused to function by holding the drums 27 against rotation.

While the axial dimensions of the governors vary, the radial dimensions thereof are desirably uniform with one result that the external surfaces of revolution 33 of the drums 27 are of equal diameter.

A bar 34 is mounted in slide bearings 35 for longitudinal movement in parallelism with the governor shaft 6 and consequently the axis of the governors, and is adjustably positioned by a rotatable calibrated dial 36 on the exterior of the camera by means of a gear 37 secured with the dial and meshing with a rack 38 on the bar. See Figure 1.

Figure 3:
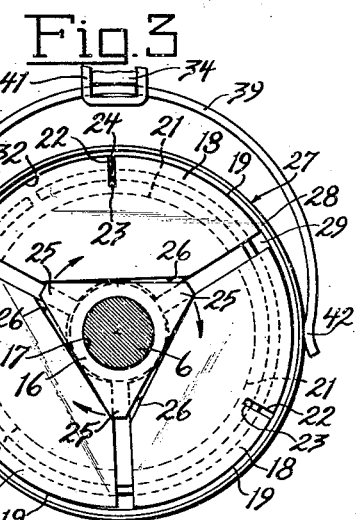
Figure 3 is an end elevational view of the governor with a part omitted.
Figure 5:
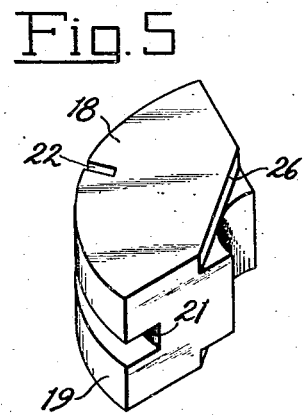
Figure 5 is a perspective view of a weighted friction element of the device.
Figure 6:
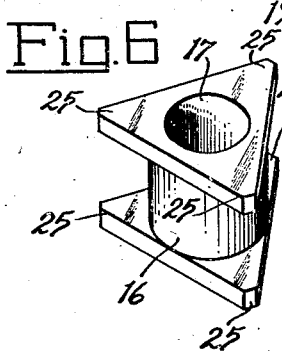
Figure 6 is a perspective view of a driving hub of the device.

A crescent-shaped spring 39 has the intermediate portion thereof secured on the bar 34 by means of a bracket 41, and the free ends 42 of this spring engage the external surface of revolution 33 of a drum 27 therebetween with a tensioned friction engagement to stop rotation of the drum and cause functioning of the governor of which this drum forms a part, as shown in Figures 1 and 3. Shifting of the bar 34 selectively engages the spring 39 with the drums 27 to selectively render the governors effective to control the speed of the governor shaft and thus to select the controlled speed of the governor shaft and of the camera mechanism.

Figure 7:
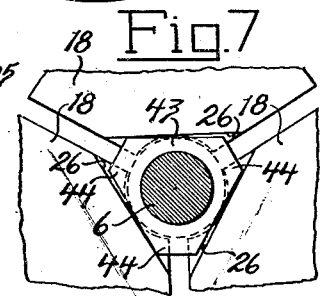
Figure 7 is a partial view similar to Figure 3 and showing a slightly modified structure.

The force exerted by the cam portions 25 to urge the friction members 18 radially outward, as hereinbefore described, may be varied by varying the radial extent of the cam portions, thus varying the control characteristic of a governor. Referring to Figure 7, a driving hub 43, corresponding with the driving hub 16 of Figure 3, has cam portions 44 of lesser radial extent than the cam portions 25 of Figure 3 with the result that more force is exerted to urge the friction members radially outward by the cam portions 44 of Figure 7 than is exerted by the cam portions 25 of Figure 3.

By reason of the use of a plurality of governors individually or selectively rendered operative for different controlled speeds, a desirable stepped speed adjustment is afforded, adjustment of the governor structure per se is not required for speed change so that the governors may be of fixed control characteristics, and where the governors are of different control characteristics they may be assembled in various combinations for different speed ranges.

While I have thus described my invention, I do not wish to be limited to the precise details described, as changes may be readily made without departing from the spirit of my invention, but having thus described my invention, I claim as new and desire to secure by Letters Patent the following:

1. In a device of the character described, the combination with a rotatable driven shaft, of a plurality of centrifugal governors of different control characteristics carried by said shaft in coaxial relation and arranged in progression therealong and comprising radially expansible centrifugally controlled friction elements connected with said shaft for rotation thereby and cooperating friction elements respectively engageable by said first mentioned friction elements and individually rotatable coaxially therewith, said cooperating elements being provided with radially facing internal surfaces of revolution for engagement with said first mentioned friction elements and with radially facing external surfaces of revolution, and control means frictionally engageable with said external surfaces to oppose rotation of said cooperating friction elements and shiftable longitudinally of said shaft to selectively engage said external surfaces.

2. In a device of the character described, the combination with a rotatable driven member, of a plurality of coaxial centrifugal governors arranged in progression along their axis and comprising radially expansible centrifugally controlled friction elements connected with said driven element for rotation thereby and cooperating friction elements respectively engageable by said first mentioned friction elements and individually rotatable coaxially therewith, said cooperating elements being provided with radially facing internal surfaces of revolution for engagement with said first mentioned friction elements and with radially facing external surfaces of revolution, the axial dimensions of said governors being different and thereby giving said governors different control characteristics and the radial dimensions thereof being uniform, and control means frictionally engageable with said external surfaces to oppose rotation of said cooperating friction elements and shiftable longitudinally of said axis to selectively engage said external surfaces.

3. In a device of the character described, the combination of a rotatably mounted driving member, a plurality of weighted friction members arranged angularly about the axis of said driving member and terminating outwardly from said axis with convex arcuate friction surfaces facing radially outward from and conformable with an external surface of revolution of said axis and provided with grooves at said friction surfaces extending and alining angularly of said axis, a radially expansible spring ring positioned in said grooves and yieldably urging said friction members radially inward with respect to said axis, driving means operative between said driving and friction members and permitting movement of said friction members radially of said axis with respect to said driving member, and a cooperating friction member with respect to which said driving and friction members are rotatable and provided with a radially facing internal surface of revolution encompassing said friction members for frictional engagement thereby.

4. In a device of the character described, the combination of a rotatably mounted driving member, a plurality of weighted friction members arranged angularly about the axis of said driving member and terminating outwardly from said axis with convex arcuate friction surfaces facing radially outward from and conformable with an external surface of revolution of said axis and provided with grooves at said friction surfaces extending and alining angularly of said axis, a radially expansible spring ring positioned in said grooves and yieldably urging said friction members radially inward with respect to said axis, driving means operative between said driving and friction members comprising cam portions on said driving member and spaced angularly about and projecting radially outward from said axis and cooperating surfaces on said friction members facing inwardly toward said axis for engagement by said cam portions to simultaneously rotate said friction members with said driving member and to urge said friction members radially outward from said axis, and a cooperating friction member with respect to which said driving and friction members are rotatable provided with a radially facing internal surface of revolution of said axis and encompassing said friction members for frictional engagement thereby.

5. In a device of the character described, the combination of a rotatable axially bored hub, a plurality of weighted friction members arranged angularly about said hub and terminating outwardly from the axis of said hub with convex arcuate friction surfaces facing radially outward from and conformable with an external surface of revolution of said axis and provided with grooves at said friction surfaces extending and alining angularly of said axis, spacing elements on said friction members within said grooves at the intermediate portions thereof and disposed radially outward from the bottoms of said grooves, a radially expansible spring ring positioned in said grooves and engaged about said spacing elements to yieldably urge said friction members radially inward with respect to said axis, driving means operative between said hub and friction members permitting movement of said friction members radially of said axis with respect to said hub, a cooperating friction member with respect to which said hub and friction members are rotatable and comprising a drum having a peripheral wall and axially spaced radial walls within which the assembly of said friction and hub members is disposed, said peripheral wall being provided with an internal surface of revolution frictionally engageable by said friction members, said radial walls being provided with bearing bores coaxial with said internal surface, and a rotatable driving carrier shaft extending through said bores of said hub and radial walls and angularly fixed with said hub and rotatable with respect to said drum.

6. In a device of the character described, the combination of a rotatable axially bored hub, a plurality of weighted friction members arranged angularly about said hub and terminating outwardly from the axis of said hub with convex arcuate friction surfaces facing radially outward from and conformable with an external surface of revolution of said axis and provided with grooves at said friction surfaces extending and alining angularly of said axis, axially extending additional grooves at the intermediate portions of said friction surfaces joining said first mentioned grooves, spacing elements engaged in said additional grooves and traversing said first mentioned grooves, a radially expansible spring ring positioned in said first mentioned grooves and engaged about said spacing elements to yieldably urge said friction members radially inward with respect to said axis, driving means operative between said hub and friction members comprising cam portions on said hub and spaced angularly about and projecting radially outward from said axis and cooperating surfaces on said friction members facing inwardly toward said axis and engaged by said cam portions to simultaneously rotate said friction members with said hub and to urge said friction members radially outward from said axis, a cooperating friction member with respect to which said hub and friction members are rotatable comprising a drum having a peripheral wall and axially spaced radial walls within which the assembly of said friction and hub members is disposed, said peripheral wall being provided with an internal surface of revolution of said axis frictionally engageable by said friction members, said radial walls being provided with bearing bores coaxial with said internal surface, and a rotatable driving carrier shaft extending through said bores of said hub and radial walls and angularly fixed with said hub and rotatable with respect to said drum.

ALBERT S. HOWELL.